United States Patent
Cunningham

[11] Patent Number: 6,133,572
[45] Date of Patent: Oct. 17, 2000

[54] INFRARED DETECTOR SYSTEM WITH CONTROLLED THERMAL CONDUCTANCE

[75] Inventor: Thomas J. Cunningham, Pasadena, Calif.

[73] Assignee: The United States of America as represented by the Administrator of the National Aeronautics and Space Administration, Washington, D.C.

[21] Appl. No.: 09/093,855

[22] Filed: Jun. 5, 1998

[51] Int. Cl.[7] .................................................. G01J 5/16
[52] U.S. Cl. ................ 250/339.03; 250/352; 250/370.15
[58] Field of Search .......................... 250/338.1, 338.2, 250/338.3, 338.4, 339.03, 352, 370.15, 332

[56] References Cited

U.S. PATENT DOCUMENTS

| | | |
|---|---|---|
| 4,694,175 | 9/1987 | Buller . |
| 5,486,698 | 1/1996 | Hanson et al. ........................... 250/332 |
| 5,523,564 | 6/1996 | Yamada et al. . |
| 5,572,312 | 11/1996 | Karlsson et al. . |
| 5,578,826 | 11/1996 | Walker et al. ......................... 250/338.3 |
| 5,589,688 | 12/1996 | Kimura et al. ........................ 250/338.4 |
| 5,597,957 | 1/1997 | Schieferdecker et al. . |
| 5,602,043 | 2/1997 | Beratan et al. . |
| 5,602,389 | 2/1997 | Kato et al. . |
| 5,602,393 | 2/1997 | Gerard . |
| 5,640,013 | 6/1997 | Ishikawa et al. . |
| 5,683,181 | 11/1997 | Shepard . |
| 5,763,885 | 6/1998 | Murphy et al. .......................... 250/352 |
| 5,945,673 | 8/1999 | Beratan et al. ....................... 250/338.3 |

*Primary Examiner*—Constantine Hannaher
*Assistant Examiner*—Albert Gagliardi
*Attorney, Agent, or Firm*—John H. Kusmiss

[57] ABSTRACT

A thermal infrared detector system includes a heat sink, a support member, a connection support member connecting the support member to the heat sink and including a heater unit. An infrared detector element is mounted on the support member and a temperature signal representative of the infrared energy contacting the support member can then be derived by comparing the temperature of the support member and the heat sink. The temperature signal from a support member and a temperature signal from the connection support member can then be used to drive a heater unit mounted on the connection support member to thereby control the thermal conductance of the support member. Thus, the thermal conductance can be controlled so that it can be actively increased or decreased as desired.

11 Claims, 2 Drawing Sheets

INFRARED DETECTOR SYSTEM WITH CONTROLLED THERMAL CONDUCTANCE

ORIGIN OF THE INVENTION

The invention described herein was made in the performance of work under a NASA contract, and is subject to the provisions of Public Law 96-517 (35 U.S.C. § 202) in which the Contractor has elected not to retain title.

TECHNICAL FIELD

The present invention is directed to a thermal infrared detector system having an improved temperature sensitivity for use as bolometers, thermopiles, ferroelectric and pyroelectric detector systems and, more particularly, to a thermal feedback arrangement that can selectively reduce the thermal conductance from an absorber to a heat sink through an anchor structure.

BACKGROUND ART

Conventional infrared detecting elements generally include quantum detectors and thermal detectors. Quantum detectors can provide excellent responsiveness and sensitivity in measuring temperature, however, they must be cooled to a temperature lower than the temperature of liquid nitrogen for use and thereby have a major disadvantage in miniaturizing an infrared detector system in addition to being relatively expensive. Thermal detectors offer advantages in that they permit a miniaturization to provide low weight and relatively low cost and do not require an active cooling system. Thermal detectors, however, provide limitations in their sensitivity, and substantial efforts have been made in this field to address these problems. One approach with a thermal IR detector designed to absorb IR radiation is to provide a free-standing membrane that is suspended by supports directly from a heat sink. The absorbed IR radiation causes a temperature rise in the membrane proportional to the intensity of the incident IR radiation, and this temperature rise is then measured using a thermal detector or other electro-thermometer.

The amount of temperature rise and thus the detector sensitivity is inversely proportional to the thermal conductance of the supports by which the absorber is suspended. Thus, the thermal conductance of these supports limits the sensitivity to less than the theoretical background limit that could be attained. In addition, attempts to reduce the conductance come at the expense, however, of the response time of the detector. That is, when the thermal conductance is rendered relatively low, the membrane temperature would then come into equilibrium slowly with its substrate and thereby limit its response time to new measurements.

U.S. Pat. No. 5,523,564 discloses an infrared detecting element that has a supporting member for supporting an infrared detecting member above a substrate with a low thermal conduction part intervening between the substrate and the support member. The support member can be actually fabricated by etching a portion of the substrate to provide supporting posts over a cavity portion with the supporting posts being porous with low thermal conductivity. The resulting structure is normally operated in a vacuum and since there is neither a solid material nor air to conduct heat between the membrane and the support, the only path of thermal conduction between them is through the relatively thin or porous supports so that the thermal conductance between the membrane and the heat sink substrate can be maintained relatively low.

In operation, the thermal radiation can be absorbed on the membrane, either directly on the membrane or by a specially added absorbing material. This causes the temperature of the membrane to rise, and this temperature is then measured by some sort of electrothermometer. The difference between the substrate and the membrane temperature is proportional to the intensity of the incident infrared radiation and can thereby be converted into electrical signals as the detector's output signal. The incident IR radiation constitutes a flux of heat into the membrane, and the heat flow out of the membrane is equal to the temperature difference between the membrane and the substrate multiplied by the thermal conductance of the supports. This temperature difference will increase until the heat flow out of the membrane is equal to the heat flux into the membrane. The membrane temperature will rise and fall with a time constant equal to the heat capacity of the membrane divided by the thermal conductance of the supports.

Due to system noise and other limitations, there is a minimum temperature difference that a thermometer can accurately detect. The amount of incident infrared radiation necessary to cause this minimum detectable temperature change is proportional to the thermal conductance of the supports by which the membrane is suspended. Therefore, the sensitivity, that is the minimum detectable amount of incident radiation, depends upon the thermal conductance of the supports. Lowering the thermal conductance of the supports, if possible, would come at the expense of the response time of the infrared detector. That is, the membrane would then come to equilibrium more slowly, if the thermal conductivity is reduced.

Another example of an infrared detector can be found in U.S. Pat. No. 5,640,013, which discloses a bolometer-type of infrared sensor with a high concentration impurity layer formed to enhance its detection sensitivity.

U.S. Pat. No. 5,602,393 discloses a micro-bolometer detector with enhanced sensitivity provided by the incorporation of an optically absorptive material structure tuned so that a predetermined design wavelength can be redirected back to cause constructive interference to thereby increase the absorption of optical radiation at the design wavelength.

U.S. Pat. No. 5,597,957 is cited for its disclosure of a microvacuum sensor providing a heating element, such as aluminum, arranged on a thin membrane. The microvacuum state is determined as a result of the thermal conduction of the gas that surrounds the sensor chip which is in turn influenced by the gas pressure to thereby enable the determination of the vacuum or gas pressure that exist.

U.S. Pat. No. 5,602,389 discloses a calibration of an infrared sensor with a black body.

U.S. Pat. No. 4,694,175 discloses a mounting arrangement of an infrared detector wherein a cold finger is used to reduce temperature variations in the detector.

U.S. Pat. No. 5,683,181, U.S. Pat. No. 5,602,043, and U.S. Pat. No. 5,572,312 are cited of general interest.

The prior art is still seeking to improve both the sensitivity and response time of a thermal infrared detector so that it can come closer to approximating its theoretical potential.

STATEMENT OF THE INVENTION

The present invention provides a thermal infrared detector system that contains a supported member, such as a membrane; thin support posts formed, for example, of silicon nitride, that support the member; an anchor structure to which the remaining end of the support posts are attached;

and a thermal heat sink and mechanical base consisting, for example, of a silicon substrate, to which the anchor structure is attached. The thin support posts provide a high degree of thermal insulation between the supported member and the anchor structure. Another thermal insulator, for example, a thin layer of silicon nitride, provides some thermal insulation between the anchor structure and the heat sink. A thermal infrared detector element is mounted on the supported member. This infrared detector element includes an infrared absorber, for example gold-black, and a temperature sensor, which can be for example, a thermoresistive sensor, a thermopile (a series of thermocouples), a ferroelectric, a pyroelectric, or other temperature sensor. Similar or compatible temperature sensors may be mounted on the anchor structure and the substrate. Infrared radiation incident on the detector system is absorbed on the supported member, and tends to raise the temperature of the supported member. The thermal infrared detector system outputs a signal consisting of the difference in temperature between the supported member and the heat sink, and this signal is representative of the intensity of infrared radiation absorbed in the supported member.

A resistive or other heater is mounted on the anchor structure, and a control mechanism consisting of an electronic amplifier utilizing feedback and a driver is used to drive the anchor structure heater. The control mechanism controls the temperature of the anchor structure, making it equal or very nearly equal to the temperature of the supported member. As intensity of the infrared radiation incident on the detector structure changes, causing the temperature of the supported member to change, the feedback aspect of the control mechanism adjusts the power directed to the anchor structure heaters. The control mechanism changes the temperature of the anchor structure so that the anchor structure temperature follows the temperature of the supported member, maintaining a very small temperature difference between the supported member and the anchor structure.

By using active control to maintain a very small temperature difference between the supported member and the anchor structure, the heat flow out of the supported member for a given support post thermal resistance is reduced. This active control mechanism results in an increase of the effective thermal resistance seen by the supported member, resulting in a greater supported member temperature for a given infrared radiation intensity, which in turn results in an increase in the system sensitivity. In addition, the time response of thermal detectors without the temperature controlled anchor structure is limited by the thermal resistance of the support posts. Improvements in sensitivity by increasing the real thermal resistance of the support posts, if such improvements can be done at all, comes only at the expense of decreasing the response time of the detector system. By controlling the time response of the control mechanism, the time response of the detector system described in this invention can be decoupled from the increased effective thermal resistance.

Thus, the present invention provides an active feedback mechanism that increases the thermal sensitivity and response of the infrared detector system by reducing the effective heat conduction from the supported member which absorbs the infrared radiation and senses the resulting temperature change. It also decouples this increased effective thermal insulation from the time response, so that it simultaneously allows for improved sensitivity and increased response time.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved infrared detector system with controlled thermal conductance.

Figure 1:
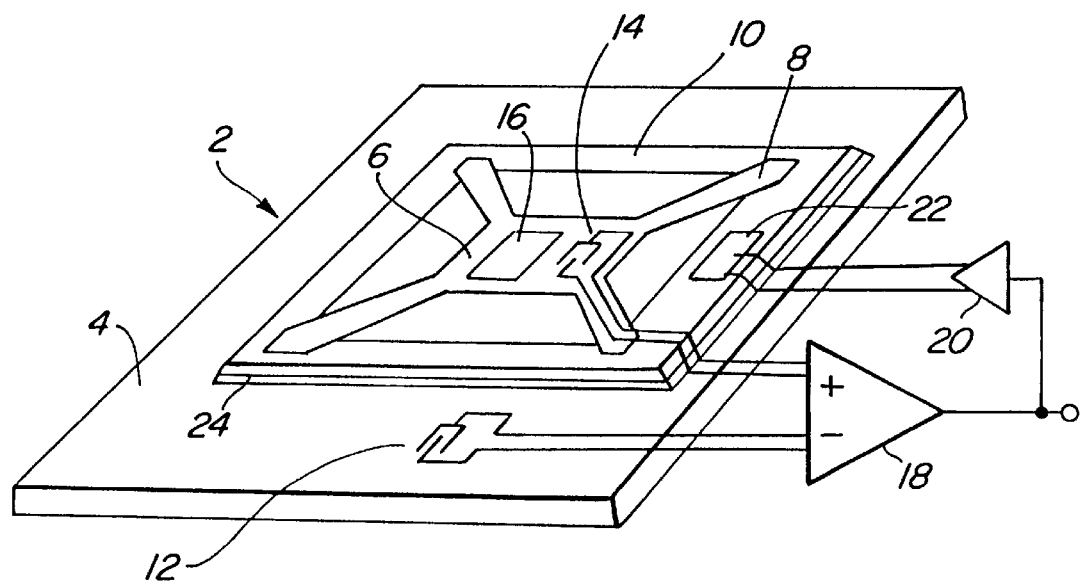
FIG. 1 is a perspective schematic drawing of the infrared detector system with a thermal feedback arrangement of the present invention.

Referring to FIG. 1, the thermal infrared detector system 2 of the present invention is disclosed. A substrate 4 serves as a heat sink and can be formed of silicon. A support member or membrane 6 can be formed of a silicon nitride and is connected by a plurality of thermal conductors or support posts 8 made of a thin silicon nitride structure. The configuration of the supports posts 8 is designed to minimize the thermal conductance permissible from the membrane 6 and can be on the order of 200 mm of silicon nitride with a width of 1–5 $\mu$m in thickness and a length of 50 to 100 $\mu$m.

The support posts 8 are connected to an anchor structure or connection support assembly 10 of 1–5 $\mu$m in thickness of a polycrystalline silicon deposited over a thermal insulating layer 24 of 200 mm in thickness of silicon nitride, which is deposited directly on the substrate or heat sink 4.

As known in the industry, the silicon nitride and polycrystalline silicon can be deposited in a vacuum environment on a substrate of a silicon wafer. Thus, a silicon wafer that will serve as the heat sink member can be coated with a deposited first film layer of silicon nitride by a reaction of silane and ammonium gases to deposit a thin initial layer of a silicon nitride. Subsequently, a thicker layer of a polycrystalline silicon material can be deposited over the initial layer of silicon nitride and then a final layer of silicon nitride can be deposited over the polycrystalline silicon material.

Figure 2:
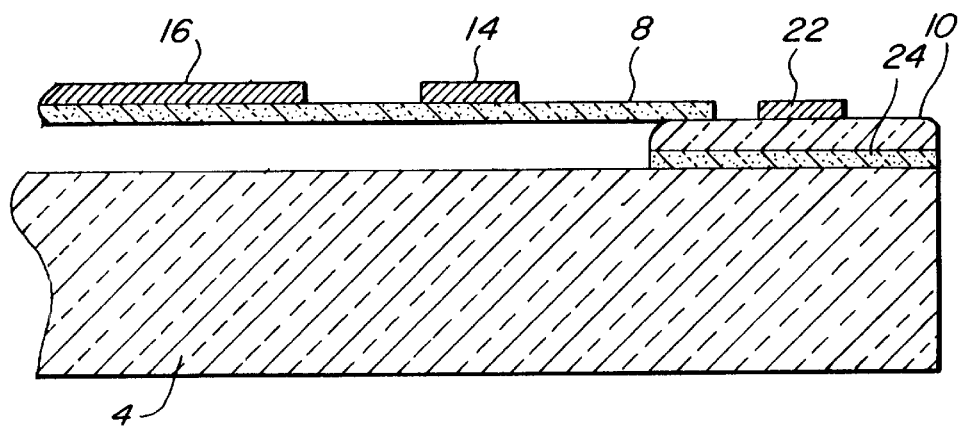
FIG. 2 is a partial schematic cross-sectional view of the thermal infrared detector system.

This pre-form product can then be etched with acid to provide the final structural configuration shown in cross-section in FIG. 2. Since the general manner of making the membrane and substrate configuration is not the contribution of the present invention and is known in the industry, specific details will be omitted herein and reference can be made to U.S. Pat. No. 5,523,564, which is incorporated by reference for more information. Suffice it to say that the present invention is not limited to silicon wafers, silicon nitrides and polycrystalline silicon materials and other materials can be used as mentioned in U.S. Pat. No. 5,523,564.

A substrate thermometer or heat detector 12 can be provided on the surface of the substrate 4. Likewise, a membrane thermometer or heat detector 14 is mounted directly on the support member 6. An absorbent material 16, such as gold-black, can also be deposited on the surface of the support member or membrane 6 to increase the sensitivity to absorbing energy from the incident infrared rays. The membrane 6, absorbency material 16 and heat detector 14 can constitute the infrared detector element. The output from the infrared detector element can then be compared with the output of the substrate thermometer 12 through a differential amplifier circuit 18 schematically shown in FIG. 1. The resulting output signal is indicative of the thermal detection of the incident infrared rays.

To improve the performance of the thermal infrared detector, a thermal feedback system can be used to increase the sensitivity by reducing the effective thermal conductance of the membrane support posts 8. By controlling the conductance of the support posts 8, the accumulation of the infrared energy can be accurately measured. Since the thermal conductance is dependent on the temperature differential between the membrane 6 and the anchor structure 10, then controlling that temperature differential can increase the thermal infrared detector sensitivity. Thus, a feedback amplifier circuit 20, which is only schematically shown in FIG. 1 can be connected to the output signal from the differential amplifier circuit 18 to drive a heater unit 22 mounted on the surface of the anchor structure or connection support assembly 10. As can be appreciated, the heater structure can include a number of heater elements 26 positioned about the anchor structure to control the differential between the membrane support member 6 and a specific support post 8. The actual thermal conductivity of the anchor structure or connection support assembly 10 can be many times that of the support posts 8. By controlling the temperature of the anchor structure, a support post 8 will have a reduced thermal conductance between the membrane 6 and the heat sink or substrate 4. Thus, the temperature of the anchor structure 10 is controlled by using a feedback mechanism so that by activating the heater elements 26, the temperature of the anchor structure 10 will follow that of the membrane 6, thereby reducing the heat flow from the membrane 6 to the substrate 4.

Figure 3:
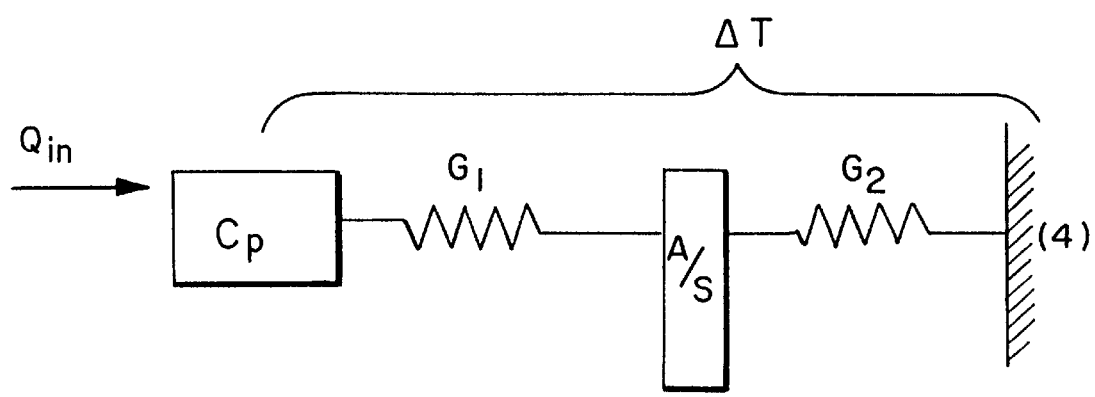
FIG. 3 is a schematic illustration of the heat flow in the thermal infrared detector with thermal feedback.

A schematic of a heat flow design is shown in FIG. 3, wherein the quantity of heat energy, $Q_{in}$, from the infrared rays incident on the membrane support member 6 having a membrane heat capacity, $C_p$, is shown. The thermal conductivity of the support post 8 is shown as a resistance value G1 with the anchor structure 10, A/S, shown intermediate of the support post 8 and the heat sink substrate 4. The thermal conductivity of the intermediate anchor structure is shown as G2.

The output signal of the infrared detector is proportional to the temperature difference $\Delta T$ between a membrane temperature $T_m$ and a substrate temperature $T_s$. If the anchor structure temperature $T_a$ is controlled by a feedback arrangement or mechanism of the present invention so that $T_a$-$T_s$ is equal to some fraction K of the temperature differential ($T_m$-$T_s$), then $\Delta T$ is given by:

$$Q_{in} = G_1(T_m - T_a)$$

$$T_a - T_s = K(T_m - T_s)$$

$$Q_{in} = G_1(1 - K)(T_m - T_s)$$

$$Q_{in} = G_1(1 - K)\Delta T$$

$$\Delta T = \frac{Q_{in}}{(1 - K)G_1}$$

-continued $$\Delta T = \frac{Q_{in}}{G_{eff}}$$

$$G_{eff} = (1 - K)G_1$$

As shown above, when the temperature of the anchor structure, $T_a$, approaches the temperature of the membrane, $T_m$, the sensitivity of the infrared detector increases.

Thus, by adding a heated anchor structure 10 and controlling its temperature using a feedback mechanism, the effective thermal conductance of the support posts 8 can be controlled in an active manner. This will result in a larger temperature change of the membrane 6 for a given incident flux of IR radiation, thereby resulting in greater sensitivity to the thermal infrared detector system. Additionally, by simply disabling the feedback control, the time constant of this system will then increase to the ordinary thermal conductance of the membrane support posts and anchor structure. The final result is that a thermal sensor can be provided with not only improved sensitivity, but also with increased response speed.

Figure 4:
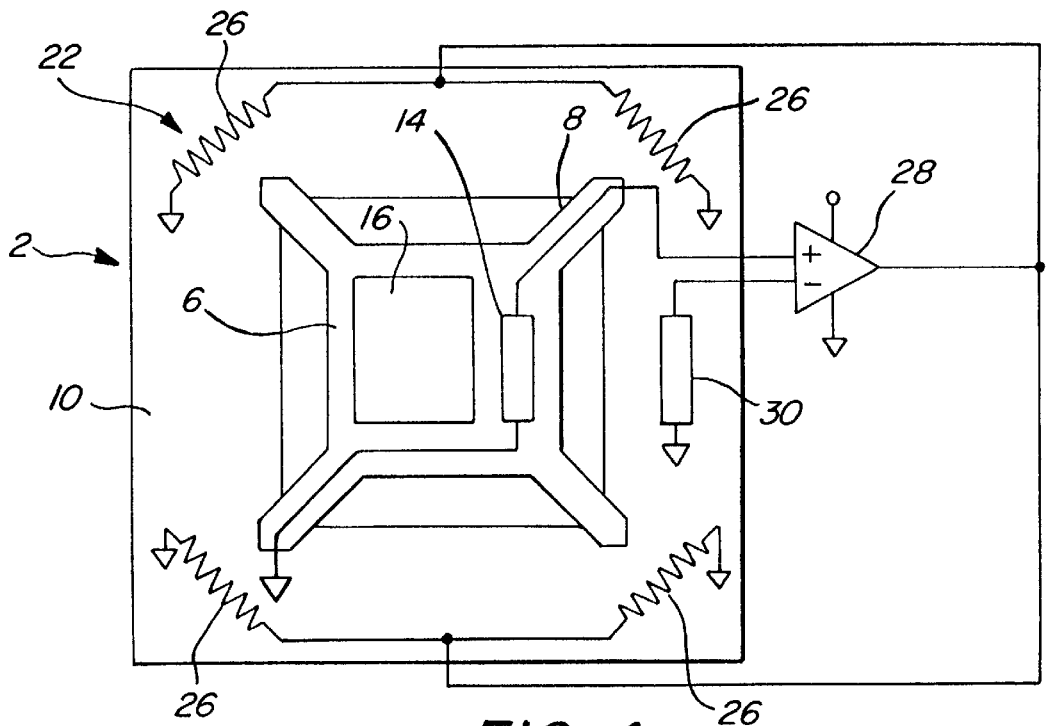
FIG. 4 is a plan schematic view of the membrane, anchor structure, and heater circuit.

Referring to FIG. 4, a more detailed schematic plan view of the membrane 6, support posts 8, and anchor structure 10, along with the feedback power circuit, is shown. The operational amplifier 28 is also connected to the membrane thermometer 14 and to an anchor thermometer 30. A power source (not shown) is used to power the individual heater elements 26 mounted on the anchor structure 10 adjacent each of the connections of the support posts 8 to the anchor structure 10. Thus, the operational amplifier 25 can drive the heater elements 26 to cause the temperature of the anchor structure 10 to approximate the temperature of the membrane 6.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A thermal infrared detector system comprising:
   a heat sink member;
   a support member;
   a connection support member connecting the support member to the heat sink member;
   a heater unit mounted on the connection support member;
   an infrared detector element mounted on the support member;
   means for providing a temperature signal representative of the infrared energy contacting the support member; and
   means, in response to the temperature signal, for driving the heater unit to reduce the thermal conductance of the connection support assembly.

2. The thermal infrared detector system of claim 1, wherein the means for driving the heater unit is a feedback circuit for causing the heater unit to approximate the temperature of the detector element.

3. The thermal infrared detector system of claim 1, wherein the support member is a membrane with support posts and the connection support member is mounted on the heat sink member and is attached to the support posts.

4. The thermal infrared detector system of claim 3, wherein the membrane and the support posts are formed of silicon nitride and the heat sink member is formed of silicon.

5. The thermal infrared detector system of claim 4, wherein the connection support member is formed of polycrystalline silicon.

6. The thermal infrared detector system of claim 3 further including a heat insulator layer between the connection support member and the heat sink member.

7. The thermal infrared detector system of claim 6, wherein the heat insulator layer is a deposited film of silicon nitride.

8. The thermal infrared detector system of claim 1, wherein the heater unit includes a plurality of heater elements and the support member is a membrane with a plurality of support posts, each heater element is mounted adjacent a respective connection of a support post to the connection support member.

9. The thermal infrared detector system of claim 1, wherein the means for driving the heater unit includes a temperature detector mounted on the connection support member and means for comparing an output of the temperature detector with the temperature signal to drive the heater unit.

10. The thermal infrared detector system of claim 1, wherein the means for providing a temperature signal representative of the infrared energy includes a substrate temperature detector.

11. In a thermal infrared detector system having a thermal infrared detector element supported by thermal conductors on a heat sink body to generate a temperature signal representative of the infrared energy contacting the detector element, the improvement comprising:

a heater member positioned between the thermal conductors and the heat sink body; and a control circuit connected to the heater member to drive the heater member to approximately the temperature of the detector element to reduce the thermal conductance of the thermal conductors.

* * * * *